United States Patent
Anderson et al.

(10) Patent No.: US 8,993,691 B2
(45) Date of Patent: *Mar. 31, 2015

(54) LIGHTWEIGHT PARTICLES AND COMPOSITIONS CONTAINING THEM

(71) Applicant: PPG Industries Ohio, Inc., Cleveland, OH (US)

(72) Inventors: Lawrence G. Anderson, Allison Park, PA (US); Chester J. Szymanski, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,375

(22) Filed: Nov. 22, 2013

(65) Prior Publication Data

US 2014/0080931 A1    Mar. 20, 2014

Related U.S. Application Data

(63) Continuation of application No. 12/190,826, filed on Aug. 13, 2008.

(51) Int. Cl.
- C08F 283/00 (2006.01)
- C09D 161/28 (2006.01)
- C09K 3/10 (2006.01)

(52) U.S. Cl.
CPC ............ C09D 161/28 (2013.01); C09K 3/1012 (2013.01)
USPC .......................................... 525/535; 428/407

(58) Field of Classification Search
USPC ................................ 525/535; 528/77; 428/327
See application file for complete search history.

(56) References Cited

U.S. PATENT DOCUMENTS

| | | | |
|---|---|---|---|
| 2,466,963 | A | 4/1949 | Ferguson et al. |
| 3,615,972 | A | 10/1971 | Morehouse, Jr. et al. |
| 3,864,181 | A | 2/1975 | Wolinski et al. |
| 3,881,047 | A | 4/1975 | Massy et al. |
| 3,975,194 | A | 8/1976 | Farnand et al. |
| 4,006,273 | A | 2/1977 | Wolinski et al. |
| 4,044,176 | A | 8/1977 | Wolinski et al. |
| 4,366,307 | A | 12/1982 | Singh et al. |
| 4,582,756 | A | 4/1986 | Niinuma et al. |
| 4,609,762 | A | 9/1986 | Morris et al. |
| 4,722,943 | A | 2/1988 | Melber et al. |
| 4,787,451 | A | 11/1988 | Mitchell |
| 5,525,262 | A | 6/1996 | Castellucci et al. |
| 5,536,756 | A | 7/1996 | Kida et al. |
| 5,663,219 | A | 9/1997 | Chokshi et al. |
| 5,912,319 | A | 6/1999 | Zook et al. |
| 5,942,556 | A | 8/1999 | Friedlander et al. |

(Continued)

FOREIGN PATENT DOCUMENTS

| | | | |
|---|---|---|---|
| RU | 2003117463 A | 12/2004 | |
| RU | 2263699 C2 | 5/2005 | |

(Continued)

*Primary Examiner* — Shane Fang
(74) *Attorney, Agent, or Firm* — William R. Lambert

(57) ABSTRACT

Disclosed are particles that have an exterior surface coated with a thin polymeric coating, such as a coating that includes a sulfur-containing polymer. Also disclosed are compositions, such as fuel-resistant sealant and coating compositions, which include such particles. Aerospace vehicles having an aperture at least partially sealed with a sealant deposited from such a sealant composition are also disclosed.

18 Claims, 1 Drawing Sheet

(56) References Cited

U.S. PATENT DOCUMENTS

| | | |
|---|---|---|
| 5,955,143 A | 9/1999 | Wheatley et al. |
| 6,172,179 B1 | 1/2001 | Zook et al. |
| 6,235,800 B1 | 5/2001 | Kyuno et al. |
| 6,486,297 B2 | 11/2002 | Zook et al. |
| 6,525,168 B2 | 2/2003 | Zook et al. |
| 6,613,436 B2 | 9/2003 | Ambrose et al. |
| 6,875,800 B2 | 4/2005 | Vanier et al. |
| 6,894,086 B2 | 5/2005 | Munro et al. |
| 6,998,107 B2 | 2/2006 | Unger |
| 7,009,032 B2 | 3/2006 | Bojkova et al. |
| 7,097,883 B2 | 8/2006 | Sawant et al. |
| 2004/0097643 A1 | 5/2004 | Bons et al. |
| 2004/0247792 A1 | 12/2004 | Sawant et al. |
| 2005/0001003 A1 | 1/2005 | Nayrac et al. |
| 2005/0270796 A1 | 12/2005 | Ichikawa et al. |
| 2005/0287348 A1 | 12/2005 | Faler et al. |
| 2006/0252881 A1 | 11/2006 | DeSaw et al. |

FOREIGN PATENT DOCUMENTS

| | | |
|---|---|---|
| WO | 00/75221 | 12/2000 |
| WO | 01/07154 | 2/2001 |
| WO | 01/66622 | 9/2001 |
| WO | 01/66642 | 9/2001 |
| WO | 2006/060272 | 6/2006 |
| WO | 2007/063001 | 6/2007 |
| WO | 2008/040508 | 4/2008 |

LIGHTWEIGHT PARTICLES AND COMPOSITIONS CONTAINING THEM

This application is a continuation application of U.S. patent application Ser. No. 12/190,826 filed on Aug. 13, 2008, now allowed, which is incorporated by reference in its entirety.

FIELD OF THE INVENTION

The present invention is directed to particles, such as microparticles, and compositions, such as coating and sealant compositions, which comprise such particles.

BACKGROUND OF THE INVENTION

Many articles have surfaces that are coated with one or more protective and/or decorative coatings for any of a variety of reasons. Aerospace vehicles constitute one exemplary category of such articles. Various types of coatings, such as primers and topcoats are commonly applied to various surfaces of aerospace vehicles, such as airplanes or helicopters, as well as many other types of articles. These coatings perform a variety of protective and decorative functions.

In addition, many articles have apertures that may exist, for example, between two components of the article. A sealant is often used to seal such apertures and aerospace vehicles constitute an exemplary category of such articles. Sealants are often used in the manufacture of aircraft for, among other things, integrated fuel tanks and fuel cell cavities. As will be appreciated, such sealants must be resistant to swelling upon prolonged exposure to fuels typically used in such tanks. Other desirable properties for such sealants include high tensile strength, low temperature flexibility, and liquidity at room temperature.

Recently, aircraft manufacturers, in an effort to increase the fuel economy and lifespan of their airplanes, have sought ways to reduce aircraft weight. As a matter of fact, it is believed that even a slight reduction in weight, even as little at 10 pounds, can save hundreds of thousands of dollars over the lifespan of certain aircraft.

As a result, coating and sealant manufacturers have sought to incorporate lightweight fillers into their formulations to reduce the density of certain of their products. A problem, however, has been that only a relatively small amount of such fillers can be added to certain formulations, such as fuel-resistant sealant formulations, without dramatically negatively impacting upon certain properties. One problem associated with these lightweight fillers is that they may exhibit poor chemical resistance to organic solvents, such as fuels to which a composition may be exposed when applied to certain portions of an aircraft. As a result, the incorporation of such lightweight fillers has been limited such that the specific gravity of aerospace sealants, by way of example, has only been successfully reduced from the 1.6 to 1.8 range to a minimum range of approximately 1.0 to 1.2 by virtue of the limited inclusion of such fillers. In addition to fuel resistance, the lightweight fillers can also have a negative impact upon desirable physical properties, such as tensile strength and/or elongation.

Therefore, it would be desirable to provide improved lightweight fillers suitable for use in various compositions, such as coatings and sealants, including, but not limited to, aerospace coating and sealant compositions. In particular, it would be desirable to provide lightweight fillers that can be incorporated into an aerospace sealant composition in an amount sufficient to provide a sealant having a specific gravity of, for example, 0.9 or less, without dramatically negatively impacting upon at least the tensile strength, elongation, and fuel resistance properties of the sealant. The present invention has been developed in view of the foregoing desire.

SUMMARY OF THE INVENTION

In certain respects, the present invention is directed to particles comprising an exterior surface coated with a thin coating, wherein thin coating comprises the reaction product of: (a) an aminoplast resin; and (b) a compound comprising functional groups reactive with the aminoplast resin.

In other respects, the present invention is directed to particles comprising an exterior surface coated with a thin coating, wherein the thin coating comprises a sulfur-containing polymer.

In still other respects, the present invention is directed to compositions, such as coating and sealant compositions. These compositions of the present invention comprise: (1) a polymeric film-forming binder comprising reactive functional groups; (2) optionally a crosslinking agent having functional groups reactive with the functional groups of the polymeric film-forming binder; and (3) particles dispersed in the binder, wherein the particles comprise an exterior surface coated with a thin coating comprising a polymer comprising reactive functional groups that are reactive with the functional groups of (1) and/or (2).

In yet other respects, the present invention is directed to compositions that comprise: (a) a sulfur-containing polymer binder; and (b) lightweight particles dispersed in the binder. These compositions have a specific gravity of less than 1.0, such as no more than 0.9, or, in some cases, no more than 0.85 g/cm$^3$. Moreover, these compositions, when applied to a substrate and cured, result in a cured composition, such as a cured sealant, that has: (i) a percent volume swell of not greater than 40%, in some cases not greater than 25%, in some cases not greater than 20% after immersion for one week at 140° F. (60° C.) and ambient pressure in jet reference fluid (JRF) type 1; (ii) an elongation of at least 80% when measured as described in AMS 3269a; and (iii) a tensile strength of at least 2000 mega-Pascals when measured according to AS 5127/1 a 7.7.

The present invention is also directed to aerospace vehicles having an aperture at least partially sealed with a sealant deposited from a sealant composition of present invention, as well as related methods.

DETAILED DESCRIPTION OF EMBODIMENTS OF THE INVENTION

Figure 1A:
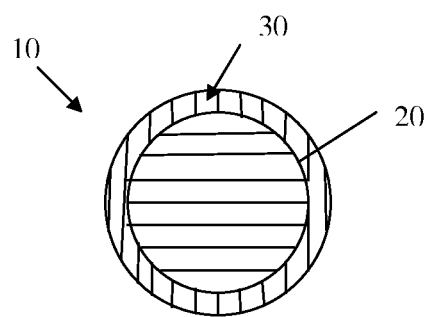
FIGS. 1a and 1b illustrate particles in accordance with certain embodiments of the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated, certain embodiments of the present invention are directed to particles, such as microparticles and/or nanoparticles. As used herein, the term "microparticle" refers to small particles with a diameter that falls essentially in the micrometer range, i.e., 1 micron or larger. As used herein, the term "nanoparticle" refers to smaller particles with a diameter that falls essentially in the nanometer range, i.e., less than 1 micron, such as 0.1 to 500 nanometers, 0.1 to 300 nanometers, 0.1 to 100 nanometers, or, in some cases, 0.1 to 50 nanometers. As used herein, the general term particles encompasses both microparticles and nanoparticles.

The shape (or morphology) of the particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

Exemplary, but non-limited, particles that are suitable for use in the present invention are described in U.S. Patent Application Publication No. 2006/0252881 A1 at paragraphs [0028] to [0055], the cited portion of which being incorporated herein by reference.

In certain embodiments, however, the particles of the present invention are lightweight particles. As used herein, the term "lightweight" when used with reference to a particle of the present invention means that the particle, prior to deposition of a thin coating as described herein, has a specific gravity of no more than 0.7, in some cases no more than 0.25 or no more than 0.1. Suitable lightweight particles of the present invention often fall within two categories—microspheres and amorphous particles. The specific gravity of the microspheres often ranges from 0.1 to 0.7 and include, for example, polystyrene foam, microspheres of polyacrylates and polyolefins, and silica microspheres having particle sizes ranging from 5 to 100 microns and a specific gravity of 0.25 (ECCOSPHERES®, W. R. Grace & Co.). Other examples include alumina/silica microspheres having particle sizes in the range of 5 to 300 microns and a specific gravity of 0.7 (FILLITE®, Pluess-Stauffer International), aluminum silicate microspheres having a specific gravity of from about 0.45 to about 0.7 (Z-LIGHT®), and calcium carbonate-coated polyvinylidene copolymer microspheres having a specific gravity of 0.13 (DUALITE 6001AE®, Pierce & Stevens Corp.).

In certain embodiments of the present invention, the particles comprise thermally expandable capsules. As used herein, the term "thermally expandable capsule" refers to a small hollow shell comprising a volatile material that expands at a predetermined temperature. In certain embodiments, such thermally expandable capsules have an average initial particle size of 5 to 70 µm, in some cases 10 to 24 µm, and in yet other cases, 10 to 17 µm. As used herein, the term "average initial particle size" refers to the average particle size of the capsules prior to any expansion.

In certain embodiments, the thermally expandable capsule comprises a volatile hydrocarbon positioned within a wall of a resin, such as a thermoplastic resin. Examples of hydrocarbons suitable for use in such capsules are, without limitation, methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon, or a mixture thereof.

Examples of the materials which are suitable for forming the wall of the thermally expandable capsule are, without limitation, polymers of vinylidene chloride, acrylonitrile, styrene, polycarbonate, methyl methacrylate, ethyl acrylate, and vinyl acetate, copolymers of these monomers, and mixtures of the polymers of the copolymers. A crosslinking agent may be used if desired.

Thermally expandable capsules suitable for use in the present invention are commercially available from various companies, specific examples of which include Union Carbide Corporations Ucar and Phenolic Microballoons (phenol balloons), Emerson & Cuming Company's Eccospheres (epoxy balloons), Emerson & Cuming Company's Eccospheres VF-O (urea balloons), Dow Chemical Company's Saran Microspheres, AKZO NOBEL's Expancel and Matsumoto Yushi Seiyaku Co., Ltd.'s Matsumoto Microspheres (Saran balloons), Arco Polymers Inc.'s Dylite Expandable Polystyrene and BASF-Wyandotte's Expandable Polystyrene Beads (polystyrene balloons), and JSR Corporation's SX863(P) (crosslinked styrene-acrylic balloons).

Figure 1B:
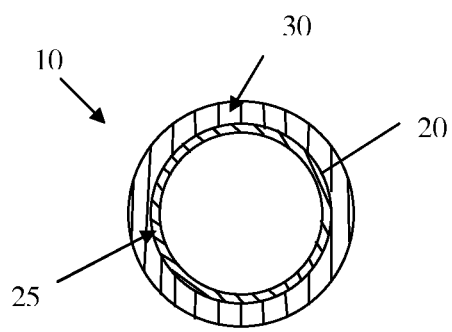

As previously indicated, the particles of the present invention comprise an exterior surface having a thin coating deposited thereon. Referring now to FIGS. 1a and 1b, there are depicted certain embodiments of the particles of the present invention. As is apparent, in each case, the particle 10 comprises an outer surface 20 upon which is deposited a thin film 30. In certain embodiments, such as is depicted in FIG. 1a, the outer surface of the particle is simply the exterior portion of a solid, i.e., non-hollow, particle. In other embodiments, such as is depicted in FIG. 1b, the exterior surface is the outer surface of a thin wall 25, such as is the case with a hollow particle which may or may not comprise a volatile liquid therein.

In the present invention, a thin coating covers at least a portion of the exterior surface of the particle. In certain embodiments, the coating is a substantially continuous coating covering from 70 to 100, 80 to 100, 90 to 100, or 100 percent of the entire surface area of the particle. In certain embodiments, the thin coating has a film thickness of less than 25, 20, 15, or 5 micrometers. In certain embodiments, the thin coating has a film thickness of at least 0.1 nanometers, such as at least 10 nanometers, or at least 100 nanometers, or, in some cases, at least 500 nanometers.

The particles of the present invention are distinct from situations where particles are merely encapsulated throughout a polymer network, such as is the case when particles are dispersed in a film-forming binder. In the present invention, a thin film is deposited on the exterior surface of an individual discrete particle. These resulting coated particles may then subsequently be dispersed in a film-forming binder, thereby resulting in dispersion of the coated particles throughout a polymer network.

As indicated, in certain embodiments of the particles of the present invention an exterior surface of the particle is coated with a thin coating comprising: (1) an aminoplast resin; and (2) a compound comprising functional groups reactive with the aminoplast resin.

In certain embodiments of the particles of the present invention, the thin coating present on the exterior surface of the particle comprises a sulfur-containing polymer. As used herein, the term "polymer" includes oligomers and both homopolymers and copolymers, and the prefix "poly" refers to two or more. As used herein, the term "sulfur-containing polymer" refers to any polymer having at least one sulfur atom, including, but not limited to, polymeric thiols, polythiols, thioethers, polythioethers and polysulfides. A "thiol", as used herein, refers to a compound comprising a thiol or mercaptan group, that is, an "SH" group, either as the sole functional group or in combination with other functional groups, such as hydroxyl groups, as is the case with, for example, thioglycerols. A "polythiol" refers to a compound having more than one SH group, such as a dithiol or higher functionality thiol. Such groups are typically terminal and/or pendent such that they have an active hydrogen that is reactive with other functional groups. A "thioether" or "polythioether" refers to a compound that contains one or more sulfur atoms, respectively, such as within the backbone of a polymer, that do not contain an active hydrogen group; that is, they are bonded on either side to another sulfur atom, a carbon atom, and the like. As used herein, the term "polysulfide" refers to any compound that comprises a sulfur-sulfur linkage (—S—S—). A "polythiol" can comprise both a terminal and/or pendant sulfur (—SH) and a non-reactive sulfur atom (—S— or (—S—S—)). Thus, a "polythiol" is often also a "polythioether" and/or a "polysulfide". Suitable polythiols include, for example, those disclosed in U.S. Pat. No. 7,009,032, incorporated by reference herein.

In certain embodiments of the particles of the present invention, the thin coating deposited on the exterior surface of the particle comprises a sulfur-containing polymer that is the reaction product of an aminoplast resin and a polythiol.

The aminoplast resins suitable for use in the preparation of particles of the present invention include those which are or are derived from at least one of glycoluril, aminotriazine and benzoguanamine. Such compounds include, for example, alkoxyalkyl derivatives of melamine, glycoluril, benzoguanamine, acetoguanamine, formoguanamine, spiroguanamine, and the like.

Aminoplast resins are based on the condensation products of formaldehyde, with an amino- or amido-group carrying substance. Condensation products obtained from the reaction of alcohols and formaldehyde with melamine, urea or benzoguanamine are most common However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine.

While the aldehyde employed is often formaldehyde, other similar condensation products can be prepared from other aldehydes such as acetaldehyde, crotonaldehyde, acrolein, benzaldehyde, furfural and glyoxal.

The aminoplast resins can contain methylol or other alkylol groups, and in most instances, at least a portion of these alkylol groups are etherified by a reaction with an alcohol. Any monohydric alcohol can be employed for this purpose, including alcohols such as methanol, ethanol, propanol, butanol, pentanol, hexanol, heptanol and others, as well as, benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins include those substantially alkylated with methanol or butanol.

In certain embodiments of the present invention, the aminoplast resin comprises highly alkylated, low imino aminoplast resins which have a degree of polymerization ("DP") of less than 3.75, often less than 3.0, and, in some cases, less than 2.0. Generally, the number average degree of polymerization is defined as the average number of structural units per polymer chain (see George Odian, *Principles of Polymerization*, John Wiley & Sons (1991)). For purposes of the present invention, for example, a DP of 1.0 would indicate a completely monomeric triazine structure, while a DP of 2.0 indicates two triazine rings joined by a methylene or methyleneoxy bridge. It should be understood that the DP values reported herein and in the claims represent average DP values as determined by gel permeation chromatography data.

Non-limiting examples of suitable aminotriazine compounds include alkoxyalkyl aminotriazines, such as (methoxymethyl) melamine-formaldehyde resin, for example, RESIMENE® CE-7103, 745, and 747 commercially available from Solutia, Inc. and CYMEL® 300, 303; ethylated-methylated benzoguanimine-formaldehyde resin, for example CYMEL® 1123; ethylated-methylated melamine-formaldehyde resin, for example CYMEL® 1116; and methylated-butylated melamine-formaldehyde resin, for example CYMEL® 202, 235, 238, 254, 272, 1135, 1133, 1168 commercially available from Cytec Industries, Inc and RESIMENE® 755, 757 commercially available from Solutia, Inc.

As indicated, in accordance with certain embodiments of the present invention, an aminoplast is reacted with a compound comprising functional groups reactive therewith to form the thin wall film that is deposited on the exterior surface of the particles of the present invention. Suitable functional groups include, without limitation, hydroxyl and thiol groups. As will be appreciated, such groups are reactive with alkylol groups present in the aminoplast resin. In certain embodiments, a polythiol is employed. In these embodiments, the relative amounts of the reactants can be selected so as to result in an amino functional sulfur-containing polymer or a thiol-functional sulfur-containing polymer, such as a thiol functional polysulfide or polythioether. As a result, in certain embodiments, for example, (>n) moles of a polythiol, such as a dithiol having the structure (I):

or a mixture of at least two different compounds having the structure (I), are reacted with (n) moles of an aminoplast to provide a thiol functional sulfur-containing polymer as the thin coating on the particles of the present invention.

In certain embodiments, such dithiols include those compounds in which $R^1$ is a $C_{2-6}$ n-alkylene group, i.e., 1,2- ethanedithiol, 1,3-propanedithiol, 1,4-butanedithiol, 1,5-pentanedithiol or 1,6-hexanedithiol.

Other suitable dithiols include those compounds in which $R^1$ is a $C_{3-6}$ branched alkylene group, having one or more pendent groups which can be, for example, methyl or ethyl groups. Suitable compounds in which $R^1$ in structure (I) is a branched alkylene group include 1,2-propanedithiol, 1,3-butanedithiol, 2,3-butanedithiol, 1,3-pentanedithiol and 1,3-dithio-3-methylbutane. Other useful dithiols include those in which $R^1$ is a $C_{6-8}$ cycloalkylene or $C_{6-10}$ alkylcycloalkylene group, for example, dipentenedimercaptan and ethylcyclohexyldithiol (ECHDT).

Further suitable dithiols include one or more heteroatom substituents in the carbon backbone, that is, dithiols in which X (described below) is a heteroatom such as O, S or another bivalent heteroatom radical; a secondary or tertiary amine group, i.e., —NR—, where R is hydrogen or methyl; or another substituted trivalent heteroatom. In certain embodiments, X is O or S, and $R^1$ in structure (I) is:

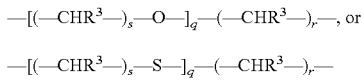

where $R^3$ is hydrogen or an alkyl, such as a methyl, group, s is an integer having a value ranging from 2 to 6, q is an integer having a value ranging from 1 to 5, and r is an integer having a value ranging from 2 to 10. In certain embodiments, the indices s and r are equal, and, in some cases, both have the value of 2. Exemplary dithiols of this type include dimercaptodiethylsulfide (DMDS) (s, r=2, q=1, X=S, $R^3$=H); dimercaptodioxaoctane (DMDO) (s, q, r=2, X=O, $R^3$=H); and 1,5-dimercapto-3-oxapentane (s,r=2, q=1, X=O, $R^3$=H). It is also possible to employ dithiols that include both heteroatom substituents in the carbon backbone and pendent alkyl, such as methyl, groups. Such compounds include methyl-substituted DMDS, such as:

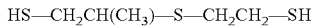

and

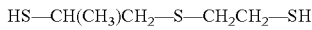

and dimethyl substituted DMDS, such as:

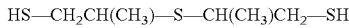

and

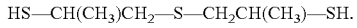

Two or more different dithiols of structure (I) can also be employed if desired.

In certain embodiments, the polythiol that is reacted with the aminoplast comprises a polymeric polythiol, such as a thiol functional polysulfide or polythioether. In certain embodiments, the polythiol comprises a thiol-terminated polythioether, such as, for example, those having the following structure (II):

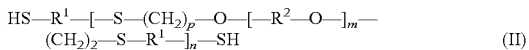 (II)

wherein $R^1$ in structure (II) denotes a $C_{2-10}$ n-alkylene group, such as a $C_{2-6}$ n-alkylene group; a $C_{2-6}$ branched alkylene group, such as a $C_{3-6}$ branched alkylene group having one or more pendent groups which can be, for example, alkyl groups, such as methyl or ethyl groups; an alkyleneoxy group; a $C_{6-8}$ cycloalkylene group; a $C_{6-10}$ alkylcycloalkylene group; a heterocyclic group; or —[(—$CHR^3$—)$_s$—X—]$_q$—(—$CHR^3$—)$_r$—, wherein s is an integer having a value ranging from 2 to 6, q is an integer having a value ranging from 1 to 5, r is an integer having a value ranging from 2 to 10, $R^3$ is hydrogen or methyl, and X denotes O, S, or —NR—, wherein R denotes an alkyl group; each $R^2$ in structure (II) denotes methylene; a $C_{2-10}$ n-alkylene group, such as a $C_{2-6}$ n-alkylene group; a $C_{2-6}$ branched alkylene group, such as a $C_{3-6}$ branched alkylene group; a $C_{6-8}$ cycloalkylene group; a $C_{6-14}$ alkylcycloalkylene, such as a $C_{6-10}$ alkylcycloalkylene; a heterocyclic group, or —[(—$CHR^3$—)$_s$—X—]$_q$—(—$CHR^3$—)$_r$—; wherein $R^3$, s, q, r, and X are as defined above; m is a rational number having a value ranging from 0 to 50, such as 0 to 10 or 1 to 10; n is an integer having a value ranging from 1 to 60; and p is an integer having a value ranging from 2 to 6.

Suitable polythioethers can be prepared by a number of methods. In certain embodiments, (>n) moles of a compound having the structure (I) described earlier or a mixture of at least two different compounds having the structure (I), are reacted with (n) moles of a compound having the structure (IIIa) and/or (IIIb), in the presence of a catalyst:

 (IIIa)

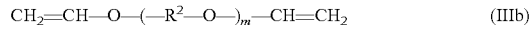 (IIIb)

In formula (IIIa), R is a divalent hydrocarbon radical having from 2 to 20 carbon atoms, wherein the hydrocarbon radical does not include a functional group reactive with —SH, such as epoxy groups and ethylenically unsaturated groups.

The compounds of formula (IIIa) are vinyl ethers. Specific examples of suitable vinyl ethers include, without limitation, ethyl vinyl ether, propyl vinyl ether, butyl vinyl ether, isobutyl vinyl ether, dodecyl vinyl ether, octadecyl vinyl ether, ethylene glycol monovinyl ether, butanediol monovinyl ether, ethylene glycol butyl vinyl ether, triethylene glycol methyl vinyl ether, 2-ethylhexyl vinyl ether, cyclohexyl vinyl ether, tert-butyl vinyl ether, tert-amyl vinyl ether, diethylene glycol monovinyl ether, hexanediol monovinyl ether, aminopropyl vinyl ether, and 2-diethylaminoethyl vinyl ether.

In formula (IIIb), m is a rational number having a value ranging from 0 to 50, such as 0 to 10 or 1 to 10, and $R^2$ is defined as in structure (II).

The compounds of structure (IIIb) are divinyl ethers. Divinyl ether itself (m=0) can be used. Other suitable divinyl ethers include those compounds having at least one oxyalkylene group, such as from 1 to 4 oxyalkylene groups (i.e., those compounds in which m is an integer from 1 to 4). In certain embodiments, m is an integer from 2 to 4. It is also possible to employ commercially available divinyl ether mixtures in producing suitable polythioethers. Such mixtures are characterized by a non-integral average value for the number of alkoxy units per molecule. Thus, m in structure (IIIb) can also take on non-integral, rational values between 0 and 50, such as between 1 and 10, or, in some cases, between 1 and 4, such as between 2 and 4.

Exemplary divinyl ethers include those compounds in which $R^2$ in structure (IIIb) is $C_{2-6}$ n-alkylene or $C_{2-6}$ branched alkylene, such as ethylene glycol divinyl ether (EG-DVE) ($R^2$=ethylene, m=1); butanediol divinyl ether (BD-DVE) ($R^2$ butylene, m=1); hexanediol divinyl ether (HD-DVE) ($R^2$=hexylene, m=1); diethylene glycol divinyl ether (DEG-DVE) ($R^2$=ethylene, m=2); triethylene glycol divinyl ether ($R^2$=ethylene, m=3); and tetraethylene glycol divinyl ether ($R^2$=ethylene, m=4) and polytetrahydrofuryl divinyl ether. In certain embodiments, the polyvinyl ether monomer can further comprise one or more pendent groups selected from alkylene groups, hydroxyl groups, alkeneoxy groups, and amine groups. Useful divinyl ether blends include "PLURIOL®" type blends such as PLURIOL® E-200 divinyl ether (commercially available from BASF), for which $R^2$=ethyl and m=3.8, as well as "DPE" polymeric blends such as DPE-2 and DPE-3 (commercially available from International Specialty Products, Wayne, N.J.).

Useful divinyl ethers in which $R^2$ in structure (IIIb) is $C_{2-6}$ branched alkylene can be prepared by reacting a polyhydroxy compound with acetylene. Exemplary compounds of this type include compounds in which $R^2$ is an alkyl-substituted methylene group, such as —CH(CH$_3$)— or an alkyl-substituted ethylene such as —CH$_2$CH(CH$_3$)—.

Other useful divinyl ethers include compounds in which $R^2$ in structure (IIIb) is polytetrahydrofuryl (poly-THF) or polyoxyalkylene, in some cases having an average of about 3 monomer units.

In some cases, trivinyl ether monomers, such as trimethylolpropane trivinyl ether; tetrafunctional vinyl ether monomers such as pentaerythritol tetravinyl ether; and mixtures thereof, can be used.

The reaction between the compounds of structures (I) and (IIIa) and/or (IIIb) is sometimes catalyzed by a free radical catalyst. Suitable free radical catalysts include azo compounds, for example azobisnitrile compounds such as azo (bis)isobutyronitrile (AIBN); organic peroxides such as benzoyl peroxide and t-butyl peroxide; and similar free-radical generators. The reaction can also be effected by irradiation with ultraviolet light either with or without the use of a photosensitizer, such as benzophenone.

The particles of the present invention can be prepared by any suitable technique, including, for example, those described in the Examples. In certain embodiments, the particles are obtained by preparing an aqueous dispersion of particles in water with an aminoplast resin, under stirring. A catalyst may then be added and the dispersion heated to, for example, a temperature of 50 to 80° C. Following a hold period the compound reactive with the aminoplast resin, such as a polythiol, may then be added to the aqueous dispersion. The catalyst in this technique is not particularly limited and may include, for example, acids, such as hydrochloric acid, sulfuric acid, p-toluene sulfonic acid, nitric acid, and the like, or inorganic salts showing acidity in aqueous solution, such as aluminum sulfate, alum (ammonium aluminum sulfate), etc.

The thus formed exterior surface coated particles may be separated by centrifugal or vacuum filtration, and the wet cake obtained can then be treated, if necessary, with a hot air flow, for example, to obtain a dried product.

As previously indicated, certain embodiments of the present invention are directed to compositions, such as fuel-resistant compositions, that comprise the foregoing particles comprising an exterior surface coated with a thin coating. In certain embodiments, for example, the present invention is directed to sealant compositions, such as fuel-resistant sealant compositions, that comprise the foregoing lightweight particles comprising an exterior surface coated with a thin coating. As used herein, the term "sealant composition" refers to a composition that is capable of producing a film that has the ability to resist atmospheric conditions, such as moisture and temperature and at least partially block the transmission of materials, such as water, fuel, and other liquid and gases. In certain embodiments, the sealant compositions of the present invention are useful, e.g., as aerospace sealants and linings for fuel tanks.

In certain embodiments, the lightweight particles described herein are present in the compositions of the present invention in an amount of at least 0.1 percent by weight, such as at least 1 percent by weight, based on the total weight of the composition. In certain embodiments, the lightweight particles are present in the coating compositions of the present invention in an amount of no more than 40 percent by weight, such as no more than 20 percent by weight, 10 percent by weight, or, in some cases, no more than 5 percent by weight, based on the total weight of the composition. The amount of lightweight particles in the composition can range between any combination of the recited values inclusive of the recited values.

The compositions, such as sealant compositions, in certain embodiments, comprise a filler comprising the previously described particles and a fuel-resistant sulfur-containing polymer binder. As used herein, the term "binder" refers to a continuous material in which particles of the present invention are dispersed. Binder materials suitable for use in the sealant compositions of the present invention include, but are not limited to, (1) polysulfide polyformal polymers, such as those described in U.S. Pat. No. 2,466,963; (2) alkyl side chain containing polythioether polymers, such as those described in U.S. Pat. No. 4,366,307; (3) polythioethers having no oxygen in the polymeric backbone, such as is described in U.S. Pat. No. 4,609,762; (4) polythioethers according to structure (II) described earlier, such as is described in U.S. Pat. Nos. 5,912,319 and 6,172,179; (5) epoxy-capped polythioethers, such as is described in United States Patent Application Publication 2005/0010003; (6) vinyl-terminated polythioethers, such as is described in United States Patent Application Publication 2006/0270796; (7) thioethers that are the reaction product of reactants comprising: (a) an alpha, omega dihalo organic compound, (b) a metal hydrosulfide, and (c) a metal hydroxide, such as is described in U.S. patent application Ser. No. 12/108,782; and (8) isocyanate functional polythioether-polyurethanes and/or polythiourethanes and/or amine/hydroxy-functional polythioethers, such as is described in U.S. patent application Ser. No. 11/772,840.

In certain embodiments, the sealant compositions of the present invention also comprise a curing agent, i.e., crosslinking agent, comprising at least one or more of the following: polyolefins, polyacrylates, metal oxides, and polyepoxides, that are co-reactive with the reactive functional groups of the sulfur-containing polymer binder. Specific exemplary curing agents include hydantoin diepoxide, diglycidyl ether of bisphenol-A such as EPON 828 (Resolution Performance Products, LLC), diglycidyl ether of bisphenol-F, Novolac-type epoxides such as DEN-40® (Dow Plastics), epoxidized unsaturated phenolic resins, dimer acid-based epoxy resins, acrylic and methacrylic polyol esters, and triallylcyanurate (TAC).

Depending on the nature of the sulfur-containing polymer(s) binder used in the sealant compositions of the present invention, the composition may, in certain embodiments, comprise 90 percent to 150 percent, such as 95 percent to 125 percent, of the stoichiometric amount of the selected curing agent(s) based upon —SH equivalents.

In certain embodiments, the compositions of the invention comprise at least one filler, aside from the particles of the present invention. Fillers may be added to compositions of the invention to impart desirable physical properties such as, for example, to increase the impact strength, to control the viscosity, or to modify the electrical properties. Fillers useful in the curable compositions of the invention for aviation and aerospace applications include those commonly used in the art, such as carbon black, calcium carbonate, silica, and polymer powders. Exemplary fillers include Sipernat® D-13 hydrophobic precipitated silica (Degussa), Winnofil® SPM precipitated calcium carbonate (Solvay Chemicals), Cabosil® TS-270 (Cabot Corporation), titanium dioxide (Du- Pont), aluminum hydroxide, and Orgasol® 1002 D Nat 1 ultrafine polyamide powder (Atofina Chemicals).

In certain embodiments, compositions of the invention comprise at least one additive selected from the following: plasticizers, colorants, cure accelerators, surfactants, adhesion promoters, thixotropic agents, fire retardants, and masking agents.

In certain embodiments, compositions of the invention comprise at least one plasticizer. In certain embodiments, the plasticizer comprises at least one of the following: phthalate esters, chlorinated paraffins, and hydrogenated terphenyls. Examples of useful plasticizers include HB-40® modified polyphenyl (Solutia, Inc.), and tung oil (Campbell & Co.). In certain embodiments, the plasticizer comprises from 1% by weight to 40% by weight of the total weight of the composition. In other embodiments, the plasticizer comprises from 1% by weight to 8% by weight of the total weight of the composition.

In other embodiments, such as where the composition comprises epoxy curing agents, compositions of the invention include at least one cure accelerator or catalyst. In certain embodiments, the cure accelerator comprises at least one of the following organic amine catalysts: triethylamine (TEA), 1,8-diazabicyclo[5.4.0]undec-7-ene (DBU), 2,4,6-tris(dimethylaminomethyl)phenol (DMP-30), 1,1,3,3-tetramethylguanidine (TMG), carbamate paste (PRC-DeSoto International), and 1,4-diazabicylco[2.2.2]octane (DABCO) (Air Products). In certain embodiments, the catalyst can be, for example, titanate TBT (DuPont).

In certain embodiments, compositions of the invention comprise one or more adhesion promoters and coupling agents. Adhesion promoters and coupling agents can enhance adhesion of the polymeric components of the composition to particulate additives, such as the particles of the present invention, as well as to substrate surfaces. Examples of adhesion promoters include phenolics such as Methylon 75108 phenolic resin (Occidental Chemical Corp.), and organosilanes comprising epoxy, mercapto or amino functionalities such as Silquest A-187® (8-glycidoxypropyl trimethoxysilane) and Silquest A-1100® (8-aminopropyltrimethoxysilane) (OSi Specialties). Other useful adhesion promoters include organic titanates such as, for example, Tyzor® tetra n-butyl titanate (TBT) (Dupont), hydrolyzed silane (PRC-DeSoto International), and phenolic cook (PRC-DeSoto International).

In certain embodiments, compositions of the invention comprise at least one thixotropic agent. A thixotropic agent may stabilize the viscosity of the composition in response to sheer stress. In certain embodiments, the thixotropic agent comprises at least one of fumed silica and carbon black.

In certain embodiments, compositions of the invention comprise at least one fire retardant. A fire retardant reduces the combustibility of the cured composition.

In still other embodiments, compositions of the invention include at least one masking agent, such as pine fragrance or other scents, which are useful in covering any undesirable low-level odor of the curable composition.

In certain embodiments, compositions of the invention further comprise at least one volatile organic solvent, such as isopropyl alcohol. The organic solvent may be included to reduce the viscosity of the curable composition during application and evaporates following application.

In certain embodiments, the compositions of the present invention comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The compositions of the present invention can be applied to any of a variety of substrates. Common substrates to which the compositions of the present invention are applied can include titanium, stainless steel, aluminum, anodized, primed, organic coated and chromate coated forms thereof, epoxy, urethane, graphite, fiberglass composite, KEVLAR®, acrylics and polycarbonates.

The compositions of the present invention can be applied directly onto the surface of a substrate or over an underlayer by any suitable coating process known to those of ordinary skill in the art, for example, by dip coating, direct roll coating, reverse roll coating, curtain coating, spray coating, brush coating, vacuum coating and combinations thereof. The method and apparatus for applying the composition to the substrate may be determined, at least in part, by the configuration and type of substrate material.

Certain embodiments of the compositions of the present invention desirably are cured at ambient temperature and pressure, however the formulations generally can be cured at a temperature ranging from 0° C. to 100° C. or higher.

As previously indicated, certain embodiments of the present invention are directed to "fuel-resistant" sealant compositions. As used herein, the term "fuel resistant" means that the compositions of the present invention, when applied to a substrate and cured, can provide a cured sealant that has a percent volume swell of not greater than 40%, in some cases not greater than 25%, in some cases not greater than 20% after immersion for one week at 140° F. (60° C.) and ambient pressure (1 atmosphere) in jet reference fluid (JRF) type 1 according to methods similar to those described in ASTM D792 or AMS 3269a, incorporated herein by reference. Jet reference fluid JRF type 1, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference): herein by reference):

| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 0.005% by volume |

In certain embodiments, the fuel-resistant compositions of the present invention have a very low specific gravity. In certain embodiments, the fuel-resistant compositions of the present invention have a specific gravity of less than 1.0, such as no more than 0.9, in some cases no more than 0.85, and, in yet other cases, no more than 0.8 g/cm$^3$.

In certain embodiments, sealant compositions of the present invention also have good low temperature flexibility as determined by known methods, for example, by the methods described in AMS (Aerospace Material Specification) 3267 §4.5.4.7, MIL-S (Military Specification)-8802E §3.3.12 and MIL-S-29574, and by methods similar to those described in ASTM (American Society for Testing and Materials) D522-88, which are incorporated herein by reference. Cured formulations having good low temperature flexibility are desirable in aerospace applications because the formulations are subjected to wide variations in environmental conditions, such as temperature and pressure, and physical conditions such as joint contraction and expansion and vibration. As used herein, the term "flexible", when used with reference to the properties of a composition, means that the cured composition has an elongation as described in AMS 3269a of at least 80%.

Furthermore, the compositions of the present invention, when applied to a substrate and cured, provide a cured sealant having high tensile strength. In other words, the cured sealant has a tensile strength of at least 2000 mega Pascals when measured according to AS 5127/1a 7.7.

As should be apparent from the foregoing description, the present invention is also directed to methods for sealing an aperture utilizing a composition of the present invention. These methods comprise (a) applying a composition of the present invention to a surface to seal and aperture; and (b) allowing the composition to cure under, for example, ambient conditions.

Illustrating the invention are the following examples, which, however, are not to be considered as limiting the invention to their details. Unless otherwise indicated, all parts and percentages in the following examples, as well as throughout the specification, are by weight.

EXAMPLES

Examples 1-3

Particles comprising an exterior surface coated with a thin coating were prepared using the ingredients and amounts of Table 1.

TABLE 1

| | | Amount (grams) | | |
|---|---|---|---|---|
| Component | Description | Example 1 | Example 2 | Example 3 |
| 1 | Expancel 091 DE 80 d30[1] | 6.0 | 6.0 | 6.0 |
| 2 | De-ionized Water | 551.8 | 551.8 | 551.8 |
| 3 | Cymel 303[2] | 22.4 | 22.4 | 22.4 |
| 4 | 10% PTSA Solution[3] | 22.4 | 22.4 | 22.4 |
| 5 | Ethylenedioxy diethanethiol[4] | — | 2.5 | 5.0 |
| 6 | Saturated Sodium Bicarbonate | 13 | 13 | 13 |

[1]Dry expanded thermoplastic hollow spheres commercially available from Akzo Nobel.
[2]Melamine-formaldehyde resin commercially available from Cytec Industries Inc.
[3]10% w/w para-toluene sulfuric acid in DI water.
[4]Commercially available from Sigma Aldrich.

Components 1, 2, and 3 were charged to a 2 liter round bottom flask equipped with a stirrer and a heating mantle. With stirring, component 4 was added and the resultant mixture was warmed to 60° C. and held for two hours. Component 5, when used, was then added over two minutes, and the mixture was then held an additional three hours at 60° C. Heat was removed and then component 6 was added. The mixture was then stirred for 10 minutes. The solids were filtered in a buchner funnel, rinsed three times with clean water, and allowed to dry at ambient temperature overnight, then 24 hours at 49° C. The powder was then sifted through a 250 micron sieve.

Examples 4-7

Sealant compositions were prepared using the ingredients and amounts of Table 2.

TABLE 2

| Component | Description | Amount (grams) | | | |
|---|---|---|---|---|---|
| | | Example 4 | Example 5 | Example 6 | Example 7 |
| 1 | Permapol 3.1e[5] | 152.54 | 152.54 | 152.54 | 152.54 |
| 2 | Calcium Carbonate | 44.8 | 44.8 | 44.8 | 44.8 |
| 3 | Silquest A1100[6] | 2.75 | 2.75 | 2.75 | 2.75 |
| 4 | DABCO L33[7] | 0.94 | 0.94 | 0.94 | 0.94 |
| 5 | Cabosil TS 720[8] | 1.3 | 1.3 | 1.3 | 1.3 |
| 6 | Example 1 Particles | — | 6 | — | — |
| | Example 2 Particles | — | — | 6 | — |
| | Example 3 Particles | — | — | — | 6 |
| 7 | Accelerator[9] | 50.8 | 50.8 | 50.8 | 50.8 |

[5]Thiol-terminated polythioether commercially available from PRC-DeSoto International, Inc., Sylmar, California.
[6]γ-aminopropyltriethoxysilane commercially available from OSi Specialties.
[7]Catalyst commercially available from Air Products and Chemicals, Inc.
[8]Treated fumed silica commercially available from Cabot Corp.
[9]2.31/1 mix of DEN 431(available from Dupont) and Epon 828 (available from Hexion specialty Chemical).

Each of the sealant compositions was rolled out to a uniform 0.125 inch thick sheet and allowed to cure at room temperature for two weeks. The resulting sheets were tested for fuel-resistance, specific gravity, tensile strength, and elongation. Results are set forth in Table 3.

TABLE 3

| Test | Example 4 | Example 5 | Example 6 | Example 7 |
|---|---|---|---|---|
| % Swell - 1 week @140° F. in MEK[10] | 101 | 85.4 | 77.3 | 77.4 |
| % Swell - 1 week @140° F. in Jet reference fluid JRF type 1[11] | 19.9 | 12.7 | 12.4 | 11.9 |
| Specific Gravity (g/cm³) | 1.01 | 1.03 | 1.01 | 1.05 |
| Tensile (mega Pascal)[12] | 1716 | 1910 | 2040 | 2069 |
| Elongation[13] | 85 | 88 | 82 | 92 |

[10]Per AS5127/1A 7.5.
[11]Per AMS 2929 type 1.
[12]Per AS5127/1a 7.7.
[13]Per AMS 3269a.

Based on the foregoing results, it is believed to be a matter of routine formulation practice to achieve, using the lightweight particles of the present invention and a sulfur-containing polymer binder, a composition that has a specific gravity of less than 1.0, such as no more than 0.9, or, in some cases, no more than 0.85 g/cm³ and that, when applied to a substrate and cured, results in a cured composition, such as a cured sealant, that has: (i) a percent volume swell of not greater than 40%, in some cases not greater than 25%, in some cases not greater than 20% after immersion for one week at 140° F. (60° C.) and ambient pressure in jet reference fluid (JRF) type 1; (ii) an elongation of at least 80% when measured as described in AMS 3269a; and (iii) a tensile strength of at least 2000 mega-Pascals when measured according to AS 5127/1a 7.7. Such compositions have not heretofore been achieved.

Examples 8-10

Particles described above were suspended in methyl ethyl ketone and the time required for the particles to sink to the bottom of the container noted. Results are set forth in Table 4.

TABLE 4

| | Example | | |
|---|---|---|---|
| | 8 | 9 | 10 |
| Particles | Example 1 | Example 2 | Example 3 |
| Time (days) | 13 | 27 | 40 |

Whereas particular embodiments of this invention have been described above for purposes of illustration, it will be evident to those skilled in the art that numerous variations of the details of the present invention may be made without departing from the invention as defined in the appended claims.

We claim:

1. A particle comprising an exterior surface having a coating thereon, wherein the coating comprises:
   (a) a reaction product of an aminoplast resin and the exterior surface; and
   (b) the reaction product of (a) and a sulfur-containing polymer wherein the sulfur-containing polymer comprises:
      functional groups reactive with the aminoplast resin; and
      functional groups reactive with a film forming binder, a cross-linking agent, or both a film forming binder and a cross-linking agent, wherein the sulfur-containing polymer comprises a thiol-terminated polythioether of Formula (II):

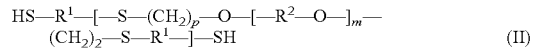

wherein,
$R^1$ is selected from a $C_{2-6}$ n-alkylene group; a $C_{3-6}$ branched alkylene group having one or more pendent groups; a $C_{6-8}$ cycloalkylene; $C_{6-10}$ alkylcycloalkylene group; heteroatomic substituted analogs of any of the foregoing, —[(—CHR³—)$_s$—O—]$_q$—(—CHR³—)$_r$—, and —[(—CHR³—)$_s$—S—]$_q$—(—CHR³—)$_r$—;
each $R^3$ is hydrogen;
m is a rational number having a value ranging from 0 to 50;
s is an integer having a value ranging from 2 to 6;
q is an integer having a value ranging from 1 to 5; and
r is an integer having a value ranging from 2 to 10.

2. The particle of claim 1, wherein the particle comprises a thermally expandable capsule.

3. The particle of claim 2, wherein the thermally expandable capsule comprises a thermally expandable thermoplastic capsule.

4. The particle of claim 1, wherein the particle comprises a polystyrene foam, a polyacrylate microsphere, a polyolefin microsphere, a silica microsphere, an alumina/silica microsphere, an aluminum silicate microsphere, a calcium carbonate-coated polyvinylidene copolymer microsphere, or a thermally expandable capsule.

5. The particle of claim 1, wherein the coating is substantially continuous from 70 percent to 100 percent of the exterior surface.

6. The particle of claim 1, wherein the aminoplast resin is coupled to the exterior surface of the particle prior to reaction with the compound.

7. A composition comprising:
a cross-linking agent;
a plurality of the particles of claim 1 comprising functional groups reactive with the cross-linking agent; and
a sulfur-containing polymer comprising terminal groups reactive with the cross-linking agent.

8. The composition of claim 7, wherein the sulfur-containing polymer is selected from a polythioether, a polysulfide, a sulfur-containing polyformal, and a combination of any of the foregoing.

9. The composition of claim 7, wherein the crosslinking agent comprises a polyepoxy.

10. The composition of claim 7, formulated as a sealant having a specific gravity less than 1.0.

11. A cured sealant prepared from the composition of claim 10.

12. The cured sealant of claim 11, formulated as a sealant having a specific gravity less than 1.0.

13. The cured sealant of claim 11, wherein the cured sealant exhibits:
a percent volume swell of not greater than 40% after immersion for one week at 140° F. (60° C.) and ambient pressure in Jet Reference Fuel Type 1;
an elongation of at least 80% when measured as described in AMS 3269a; and
a tensile strength of at least 2000 mega-Pascals when measured according to AS 5127/1a7.7.

14. A method of using the particle of claim 1, comprising dispersing the particle in a composition comprising a sulfur-containing polymer.

15. The particle of claim 1, wherein the functional groups reactive with a film forming binder, a cross-linking agent, or both a film forming binder and a cross-linking agent comprise thiol groups.

16. The particle of claim 1, wherein the functional groups reactive with a cross-linking agent are selected from thiol groups, vinyl groups, isocyanate groups, amine groups, and hydroxy groups.

17. The particle of claim 1, wherein the functional groups reactive with a film-forming binder are selected from olefinic groups, acrylate groups, and epoxy groups.

18. The particle of claim 1, wherein between functional groups reactive are reactive with a cross-linking agent.

* * * * *